C. C. CARPENTER.
FLY TRAP.
APPLICATION FILED OCT. 1, 1908.

992,158.

Patented May 16, 1911.

WITNESSES:

INVENTOR
Clifford C. Carpenter
BY
ATTORNEY

UNITED STATES PATENT OFFICE.

CLIFFORD C. CARPENTER, OF TACOMA, WASHINGTON.

FLY-TRAP.

992,158.  Specification of Letters Patent.  Patented May 16, 1911.

Application filed October 1, 1908. Serial No. 455,589.

*To all whom it may concern:*

Be it known that I, CLIFFORD C. CARPENTER, a citizen of the United States of America, residing at Tacoma, in the county of Pierce and State of Washington, have invented certain new and useful Improvements in Fly-Traps, of which the following is a specification, reference being had therein to the accompanying drawing.

This invention relates to fly traps and has for its object to provide improved means for holding and exposing the bait, and for holding the trapped flies. I obtain these objects by the devices illustrated in the accompanying drawing, in which—

Figure 1:
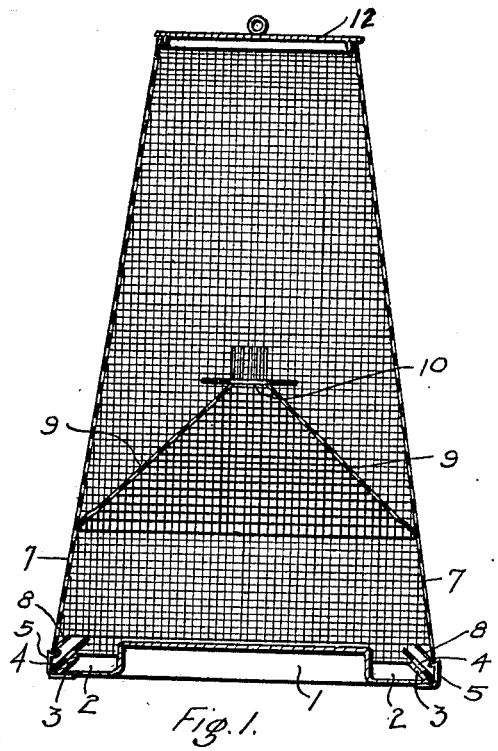
Figure 2:
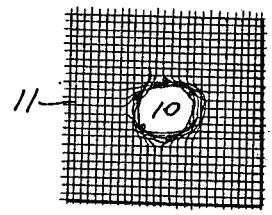
Figure 3:
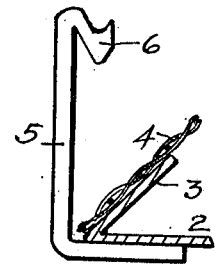
Figure 4:
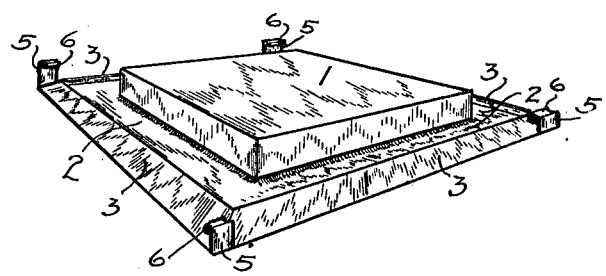

Figure 1 is a vertical section of my improved fly trap; Fig. 2 is a plan of the barrier to prevent the egress of flies from the holding compartment; Fig. 3 is an enlarged elevation of one of the posts; and Fig. 4 is a perspective view of the base piece.

Similar numerals of reference refer to similar parts throughout the several views.

The base of this fly trap consists of a metallic body having a centrally located portion 1 raised above the level of the surrounding part 2. The outer edge 3 of this metallic body is turned back at an angle. A piece of metallic netting 4 is secured to this edge or rim 3 and extends inward therefrom a short distance in an inclined position. At suitable intervals around the edge of the base are secured the posts 5 which are provided with lugs 6 at their upper ends adapted to receive the lower edge of the main netting. The bait is placed on the part 2 between the raised part 1 and the rim 3 and is thus kept near to the outer edge of the trap, thus increasing its attractive power over a centrally located bait.

A box of metallic netting 7 is provided having its lower end open and adapted to fit on and be supported by the posts 5, and having its lower edge 8 turned inward and upward into a plane parallel with the plane of the netting 4. The posts 5 hold the two nettings 4 and 8 apart a sufficient distance so that a fly will readily walk up between them under the attraction of the bait which is immediately below and in front of it.

As soon as a fly has reached the end of the part 4 it finds that it can fly freely to the top of the raised part 1 and can eat the bait on the part 2. Within the netting box 7 is a pyramidal partition 9 having an opening 10 at its top and formed also of metallic netting and having the wires surrounding the opening bent vertically upward. A barrier 11 formed of a small piece of metallic netting with irregular edges is placed over the opening 10, the vertical wires above mentioned passing through the barrier sheet 11, and the wires of the barrier sheet 11, which cross the opening 10 are bent out of alinement so as not to close said opening. Flies, having taken some of the bait, will fly to the side walls of the box 7 and will crawl up them to the under side of the partition 9 and through the opening 10 into the holding compartment above the partition 9. They cannot readily leave this compartment as they would have to fly straight down through the opening 10 or climb up the partition 9 and around the irregular edge of the sheet 11 and over the vertical wires surrounding the opening 10 and then directly downward. The sheet 11 having irregular edges, flies will not readily climb around it, neither will they readily climb up and over the vertical wires. A removable cap 12 is provided by means of which the dead flies in the holding compartment may be removed. The box 7 rests on the posts 5 but is not secured thereto, so that if the bait is to be renewed, or the base cleaned, the box 7 is simply lifted off the posts 5.

Having described my invention what I claim is:

In a fly trap the combination with a base, having a centrally raised portion and the edges thereof bent inwardly at an angle, forming a bait receptacle in combination with said raised portion, of an inwardly extending strip of netting secured to said edges, spaced supporting posts secured to the under side of said base and extending vertically, having at their upper terminals angularly bent supporting lugs, a netting box carried by said angularly bent lugs, provided with an inwardly extending flange along the lower edge, said flange being parallel to the strip of netting carried by the edges, a pyramidal partition within said netting box, said partition having a central opening therein, and vertical flanges surrounding said opening, and a horizontal barrier mounted on said flange.

In testimony whereof I affix my signature in presence of two witnesses.

CLIFFORD C. CARPENTER.

Witnesses:
M. F. McNeil,
S. E. Willaby.

Copies of this patent may be obtained for five cents each, by addressing the "Commissioner of Patents, Washington, D. C."